June 14, 1966  E. BECHARD  3,255,805
APPARATUS AND METHOD FOR LIQUID-SOLID SEPARATION
Filed Feb. 14, 1963  2 Sheets-Sheet 1
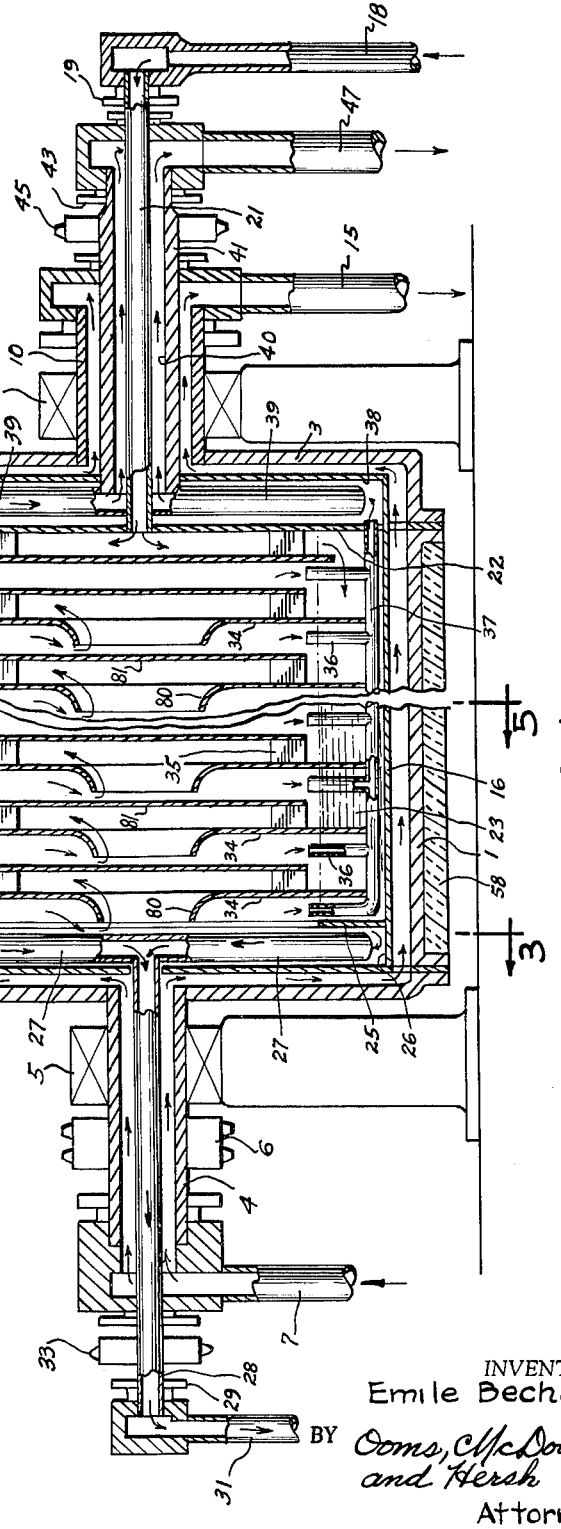
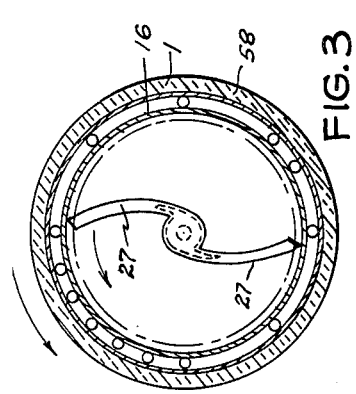
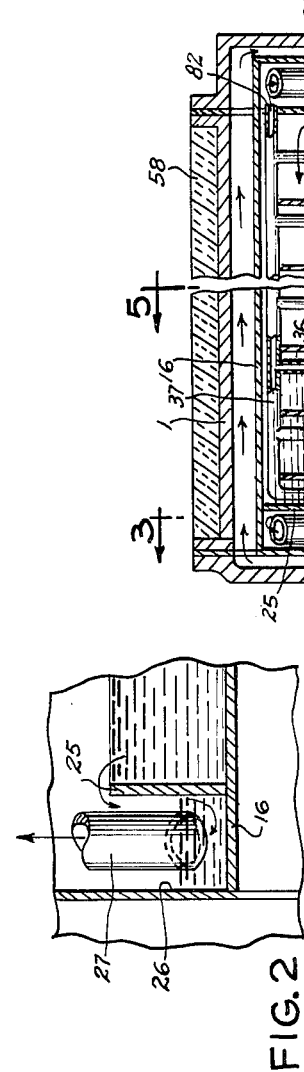
INVENTOR.
Emile Bechard
BY Ooms, McDougall and Hersh
Attorneys June 14, 1966 E. BECHARD 3,255,805
APPARATUS AND METHOD FOR LIQUID-SOLID SEPARATION
Filed Feb. 14, 1963 2 Sheets-Sheet 2

INVENTOR.
Emile Bechard
BY Ooms, McDougall
and Hersh
Attorneys

United States Patent Office 3,255,805
Patented June 14, 1966

3,255,805
APPARATUS AND METHOD FOR LIQUID-SOLID
SEPARATION
Emile Bechard, Paris, France, assignor to
Rene G. La Vaux
Filed Feb. 14, 1963, Ser. No. 258,441
13 Claims. (Cl. 159—6)

This invention relates to an improved apparatus and related method for the separation of solid and liquid components normally found in solution. The invention is particularly suitable for the operation of salt from brine solutions whereby fresh water will be provided.

It is well-known that there are a number of proposed methods which are capable of providing for the conversion of saline or brackish water into fresh water. It is equally well-known that such methods have proven commercially undesirable due to the inefficiency thereof. Thus, the cost per unit volume of fresh water produced has been prohibitive or the capacity of the equipment employed for such purposes has been insufficient.

It is an object of this invention to provide an improved means and related method for the treatment of solid-liquid solutions whereby the components thereof can be separated in a highly efficient manner.

It is a more particular object of this invention to provide a method for the separation of solutions such as saline or brackish water whereby fresh water can be produced at a relatively low unit cost and in practical volumes.

It is an additional important object of this invention to provide an apparatus capable of achieving the foregoings methods and adapted to be produced and to operate in a highly efficient and reliable manner.

These and other objects of this invention will appear hereinafter and for purposes of illustration but not of limitation specific embodiments of this invention are shown in the accompanying drawings in which:

FIGURE 1 is a vertical sectional elevation of the structure which primarily characterizes the features of this invention;

FIGURE 2 is an enlarged detail view illustrating the solution removal portion of the structure;

FIGURE 3 is a cross-sectional view, reduced in size, taken about the line 3—3 of FIGURE 1;

Figure 4:
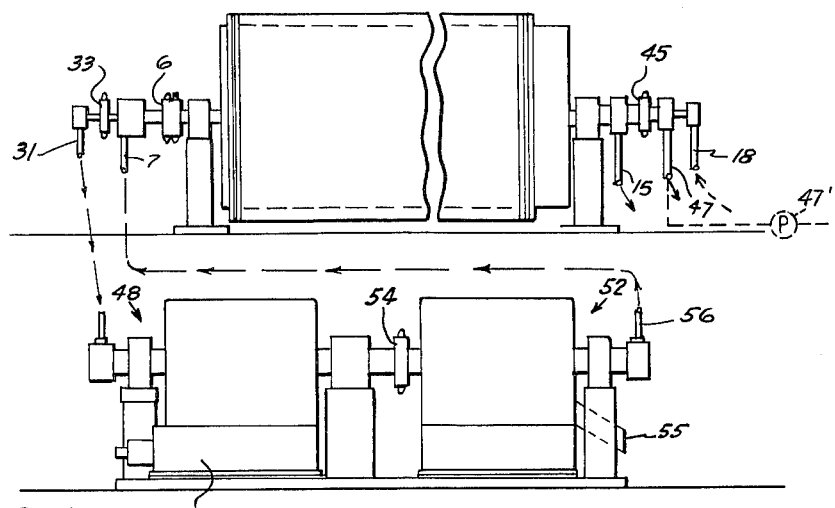
FIGURE 4 is an elevational view, partly diagrammatical, illustrating a suitable system for use in conjunction with the structure of this invention; and, FIGURE 5 is a cross-sectional view taken about the line 5—5 of FIGURE 1.
Figure 5:
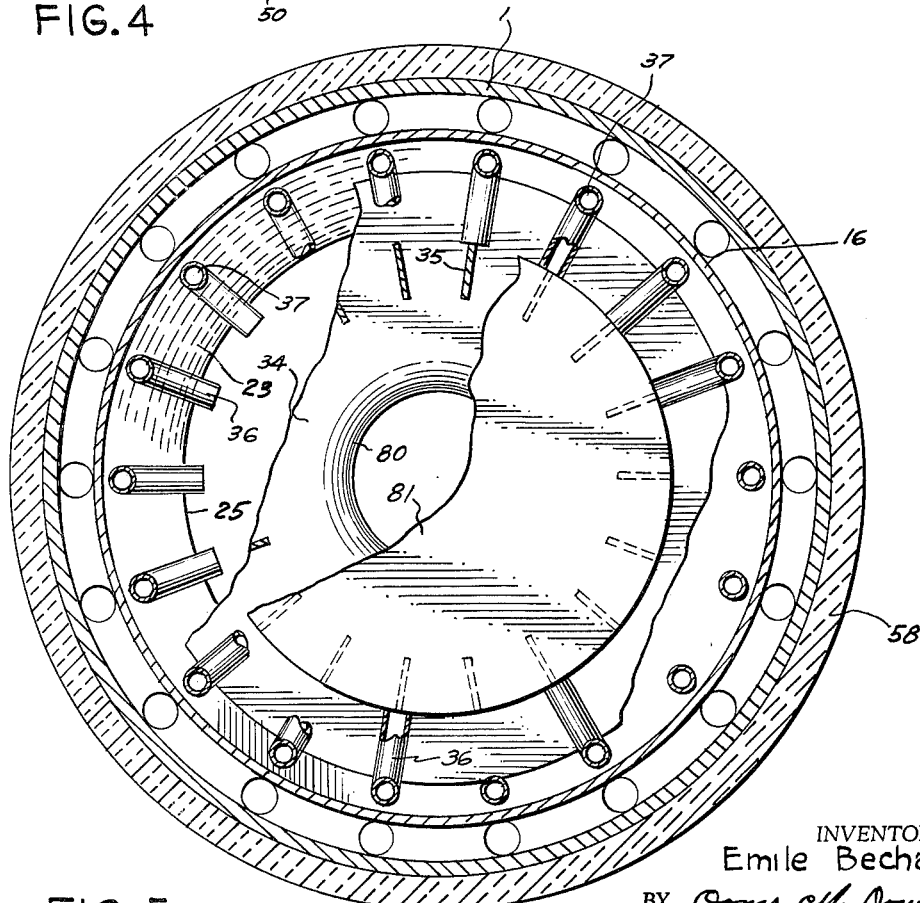

The system of this invention includes the use of a housing construction which comprises a rotatable outer housing and a rotatable inner housing located in spaced-apart relationship relative to the outer housing. A fluid is circulated through the space defined between these housings and this fluid is introduced at a temperature in excess of the boiling point of the liquid component which is dissolved in the solution to be treated. The solution is circulated through the inner housing in a counterflow direction relative to this fluid and the rotation of the housings is maintained whereby centrifugal forces will cause this solution to form a continuous band adjacent the inner surfaces of the inner housing. A heat exchange reaction will take place whereby the liquid component in the solution will be vaporized and means are provided for removing the vapor from the system.

The means for removing the vapor from the system constitute certain important aspects of the apparatus of this invention. These means include a ventilating system which is divided into a plurality of stages and which is adapted to direct the vaporized liquid into means for recovering this liquid. The entire operation is carried out under conditions whereby the provision of a plurality of stages in the apparatus can be accomplished while producing highly efficient results.

The concepts of this invention embody the recovery of the concentrated solution which results after removal of certain amounts of the liquid component through vaporization. Conventional evaporating and separating structures are employed which provide for recovery of the liquid and solid components of the solution and further economies are realized when the recovered liquid component is employed as the heat exchange fluid in the housing construction above described.

FIGURE 1 of the accompanying drawings illustrates a multistage structure which may be termed a turbo-evaporator construction. This construction includes a cylindrical outer housing 1 having a first flange portion 2 closing off one end, and a second flange portion 3 closing off the opposite end. Hollow shafts 4 and 10, respectively, extend outwardly from these ends of the housing 1.

The shaft 4 is rotatably fixed within a bearing element 5 and a sprocket construction 6 is fixed on this shaft whereby the housing can be rotatably driven. At the opposite end of the housing 1, an outer shaft 10, which surrounds the shaft 41 is mounted in a bearing 11.

A vapor inlet conduit 7 communicates with the shaft 4 whereby a heated fluid is adapted to be passed through the shaft 4 and into the space defined between the outer housing 1 and the inner housing 16. The outlet 15 for this fluid communicates with this space through the opening defined between the shafts 10 and 41.

An inlet conduit 18 for the solution to be treated is located at the opposite end of the construction. This inlet communicates with a rotatably mounted tubular member 21 which is free to rotate in the shaft seal device 19. It will be noted that the tubular member 21 provides a path for the solution which extends to vertical wall 22 fixed within the inner housing 16. The solution designated by the number 23 is adapted to spread out in the form of a circular band along the interior surface of the inner housing 16 in response to centrifugal forces which are set up due to rotation of the housings.

An annular barrier 25 is formed adjacent the end of the inner housing 16 and this barrier maintains the solution 23 at a constant level within the construction. As the solution is fed into the inner housing, excess amounts thereof will spill over the barrier 25 into the chamber 26. Means for removing the solution through outlet conduit 31 include a tubular member 28 coaxially mounted with respect to the inner and outer housings. Scoop members 27 extend radially outwardly from the end of this tubular member and the ends of these scoop members terminate at a point adjacent the interior surface of the housing 16. The tubular member 28 is rotatably mounted in the shaft seal 29 associated with the conduit 31. A sprocket 33 is fixed on this tubular member whereby the tubular member can be rotated relative to the housing construction.

A ventilating system is secured within the inner housing 16. This system includes a plurality of plates 34 which are each provided with outwardly turned portions 80. These portions define circular openings in each of the plates 34. Partitions 81 are connected to the plates 34 by means of a plurality of small plates 35. These small plates define a plurality of radial passages communicating the spaces between the plates 34 and the partitions 81.

As previously noted, fluid heated to temperatures in excess of the boiling point of the liquid component of the solution is circulated through the space defined between the inner and outer housings. A heat exchange reaction takes place between this fluid and the solution whereby a certain percentage of the liquid component is vaporized. This vapor is naturally passed into the spaces defined between the partitions and associated plates and the ventilating characteristics of this construction tend to drive the vapor produced in the direction suggested by the arrows in FIGURE 1. Removal of the vapor is effected by means of a plurality of relatively small, radially extending ducts 36, each of which communicates with one of the horizontally extending main ducts 37. These main ducts in turn communicate with chamber 38 through openings 82 defined in the wall 22.

Removal of the liquid component from the chamber 38 is effected by means of scoop members 39 which communicate with the opening 40 defined between the shaft 41 and the tubular member 21. An outlet 47 communicates with this opening 40. Rotation of the scoop means is effected by means of sprocket 45 and the rotary movement is permitted since the end of the shaft 41 is journalled in shaft seal 43.

As best shown in FIGURE 4, the conduit 31 extends to a centrifuge 48 and this centrifuge is in turn connected to a separator 52. Drive means are provided for rotating these constructions simultaneously through operation of sprocket 54. It will be apparent that the solution discharging through the conduit 31 will be a concentrated solution since a percentage of the liquid component originally present in the solution has evaporated during passage of this solution through the housing 16. The centrifuge 48 is disposed on a heater construction 50 whereby the concentrated solution maintained therein can be evaporated. The evaporated mixture when transferred to the separator 52 will be divided into a solid component which can be removed through outlet 55 while the vapor component will be removed through outlet 56. By connecting this outlet with the inlet 7, the vapor component can be utilized as the heating fluid which is circulated through the housing system.

The operation of the construction will be described with reference to a salt water system; however, it will be understood that various other solute-solvent systems can be treated in accordance with the concepts of this invention. The fluid comprising water vapor entering through inlet 7 is maintained at a temperature of about 200° C. in the treatment of salt water. The salt water is introduced through conduit 18 at ambient temperature; however, auxiliary heating of this salt water may be resorted to particularly if an increase in the number of stages within the housings is contemplated. It will be appreciated that due to the counterflow arrangement provided, the hottest portions of the fluid passing between the housings 1 and 16, will be disposed in heat exchange relationship with the hottest portions of solution. Thus, the heat exchange reaction provides for progressive heating of the salt water as it moves from right to left and progressive cooling of the water vapor as it moves from left to right.

As the salt water is heated, the water component thereof reaches its boiling point and vaporizes whereby it will tend to move into the spaces defined between the plates and partitions of the ventilating system. Due to the nature of the equipment involved, this passage of the water vapor out of the solution is facilitated since the centrifugal forces will urge the colder, heavier portions of the solution outwardly while the warmer portions thereof will be disposed adjacent the interior of the housing 16 thereby exposing the warm surfaces for removal of water vapor. A suitable construction for the separation of salt water provides for the introduction of the water vapor through inlet 7 at 200° C. and this vapor, becoming condensed, is removed through conduit 15 at about 90° C.

Conditions of this nature can be advantageously maintained in a construction containing 60 sets of plates and partitions (each of these sets constituting one stage). The diameter of the housing 1 is preferably about 3 m. and the diameter of the inner housing is about 2.9 m. with a space of 5 cm. therebetween. A rotation of about 300 r.p.m. for the housing will be sufficient to provide the necessary centrifugal action while the rotary speed of the scoop constructions 27 and 39 are maintained at about 100 r.p.m. and 120 r.p.m. respectively to achieve the necessary removal of concentrated brine and vaporized liquid. It will be understood that with regard to these scoop members, the relative speed between these members and the housings is the important factor. There are many possible variations in rotary speeds for the housings and the speed of the scoops can therefore vary accordingly.

It has been found that the heat transfer reaction which takes place under the centrifugal conditions provides a highly effective arrangement. Thus, bubbling, and consequent mixing of the solution is eliminated or minimized, and, therefore, the warmer inner surface of the solution comprises a relatively stable area. This greatly facilitates evaporation and, therefore, the rotational speeds chosen are designed to most effectively promote this situation.

As noted, the heaviest portions of the solution seek the outer areas of the inner housing. By the same token, the heavier, colder portions of the fluid introduced through inlet 7 seek the outer areas within the housing 1 while the hotter portions of this fluid are maintained against the wall of the housing 16 to provide a more suitable heat exchange reaction. Thermal insulation 58 is provided on the outside of the housing 1 in order to minimize heat loss and this combination of factors greatly increases the operating efficiency of the described apparatus.

The ventilator equipment comprising the plates 34, partitions 81, and the smaller plates or blades 35 provide a configuration which is highly suitable for passage of the vapor out of the inner housing. As the water evaporates, the vapor is passed into one of the stages defined by these members and the heavier portions of this vapor are eventually passed through ducts 36 whereby they can be condensed while passing through main ducts 37. It will be noted that the size of the central openings in the plates 34 progressively increase from left to right in the illustrated construction. This arrangement has been found to be particularly suitable in view of the pressure conditions which exist within the inner housing. This arrangement thus cooperates with the structural characteristics of the ventilating system to provide the results of this invention.

As previously noted, the temperature in the solution and in the incoming fluid is highest at the left hand side of the construction. The vapor produced in this area also builds-up the highest pressure conditions within the housing and the pressure decreases gradually from left to right. The differential pressure thus provides for flow of the vapor from left to right. Atmospheric pressure can be maintained in the chamber 38; however, a vacuum pump means 47' (see FIGURE 4) can be associated with the outlet 47 to provide for greater pressure differential particularly where an increase in the number of stages within the construction is to be provided.

Condensation of the vaporized water can occur through build-up of pressure within the housing 16. In addition, condensation will result through heat exchange between the cool incoming solution and any vapor not yet condensed in the ducts 37. All of the water, which may include some vapor, is removed by means of the scoops 39. It will be appreciated that although substantial pressures may be built up within the housing 16, a small pressure differential between the successive stages is preferred, and, accordingly, a large number of such stages can be effectively employed.

It will be understood that the fluids introduced through inlet 7 may comprise completely separate vapors or liquids although the use of water vapor from the separator 52 is preferred in order to provide for recovery of the latent heat. This water, when removed through outlet 15, can be joined with the water from outlet 47 and will therefore comprise part of the yield from the apparatus. Further economies are possible if the yield is passed in heat exchange relationship with the incoming salt water whereby the salt water will be preheated.

Generally speaking, the primary advantages of this invention are realized through the combination of centrifugal force in a multistage evaporator wherein vaporization of solutions to be separated is effected. This combination has been found to provide a system which does not require extreme temperature differentials between the heating fluid and the incoming solution. The counterflow concept employed is also highly important as a contributing factor in the inventive combination.

Apart from the general concepts, it will also be appreciated that the structural characteristics of the system constitute various important features thereof. Among these is the provision of a series of ventilating means of a unique configuration wherein partitions are provided which extend into the solution being treated to form vapor-proof seals between adjoining stages of the construction. An additional important feature comprises the use of the novel scoop means which operate at velocities different from the housing velocity whereby highly efficient removal of purified water and concentrated brine can be effected.

Finally, it is to be appreciated that the utilization of the described apparatus in a unique combination with conventional centrifuges and separators represents a further basic area of invention. These additional mechanisms provide a system for increasing the yield while also providing means for recovering heat originally expended in the operation of the turboevaporators.

It will also be understood that various changes and modifications can be made in the described constructions which provide the characteristics of this invention without departing from the spirit thereof particularly as defined in the following claims.

That which is claimed is:

1. An apparatus for the separation of a liquid-solid solution comprising an outer, horizontally disposed, cylindrical housing, an inner, horizontally disposed, cylindrical housing disposed in spaced-apart relationship with respect to said outer housing and mounted coaxially therewith, means rotatably supporting each of said housings and means for simultaneously rotating said housings about their axes, heating fluid inlet means at one end of said housings communicating with the space defined between said housings, means for introducing a heating fluid into said space which is heated to a temperature in excess of the boiling point of the liquid component of said solution, heating fluid outlet means at the opposite end of said housing whereby said fluid can be continuously circulated in one direction through said space, inlet means for said solution situated at said opposite end and communicating with the interior of said inner housing, outlet means for said solution at said one end whereby said solution can be continuously circulated through said inner housing in a direction opposed to said one direction, said means for rotating said housing being adapted to impose centrifugal force on said solution sufficient to maintain said solution as a confined, generally circular, band all around the interior of said inner housing, a ventilating means secured within said inner housing and rotatable therewith, said ventilating means being located within the confines of said circular band and means communicating said inner housing with the exterior of said apparatus whereby vapor formed in said inner housing is adapted to be passed out of said inner housing through said opposite end with the aid of said ventilating means.

2. A method for effecting solid-liquid separation from a solution containing the same wherein there is provided a rotatable outer housing and an inner housing disposed within said outer housing, said inner housing being disposed in spaced-apart relationship with respect to said outer housing and being rotatable therewith, said method including the steps of introducing a heating fluid at one end of the housing into said space between said housings, passing said fluid through said space and withdrawing said fluid from the opposite end of the housings, said fluid having been heated to a temperature in excess of the boiling point of the liquid component of said solution, introducing said solution into said inner housing at said opposite end and withdrawing said solution from said one end whereby said solution is passed in counterflow relative to said fluid with the wall of said inner housing separating said solution and said fluid, and rotating said housings at a rate sufficient to impose centrifugal force on said solution, said force being sufficient to maintain said solution as a confined band all around the interior of said inner housing, and removing the solution vapor formed through heat exchange between said fluid and said solution.

3. An apparatus for the separation of a liquid-solid solution comprising an outer, horizontally disposed cylindrical housing, an inner, horizontally disposed, cylindrical housing disposed in spaced-apart relationship with respect to said outer housing and mounted coaxially therewith, means rotatably supporting each of said housings and means for rotating said housings about their axes, fluid inlet means at one end of said housings communicating with the space defined between said housings, means for introducing a fluid into said space which is heated to a temperature in excess of the boiling point of the liquid component of said solution, fluid outlet means at the opposite end of said housing whereby said fluid can be continuously circulated in one direction through said space, inlet means for said solution situated at said opposite end and communicating with the interior of said inner housing, outlet means for said solution at said one end whereby said solution can be continuously circulated through said inner housing in a direction opposed to said one direction, said means for rotating said housing being adapted to impose centrifugal force on said solution sufficient to maintain said solution as a confined, generally circular, band all around the interior of said inner housing, a ventilating means secured within said inner housing and rotatable therewith, and means communicating said inner housing with the exterior of said apparatus whereby vapor formed in said inner housing is adapted to be passed out of said inner housing with the aid of said ventilating means, and wherein said ventilating means comprises a plurality of circularly shaped plate means, annular out-turned portions formed on said plate means and extending toward said one end to define central openings in said plate means, a plurality of partitions interposed between adjacent ones of said plate means, a plurality of duct means disposed in communication with the spaces defined between adjacent plate means and partitions, said duct means being adapted to remove vapors formed in said spaces, and main duct means communicating with said first mentioned duct means for aiding in removal of said vapor from said apparatus.

4. An apparatus in accordance with claim 3 wherein said main duct means comprise horizontally extending tubular members located closely adjacent the inner surface of said inner housing, and wherein said first mentioned duct means comprise a plurality of relatively small tubular members extending radially inwardly from said main duct means, said small tubular members having a length in excess of the thickness of said band of solution whereby the inlet ends thereof will be exposed to the spaces between said plates and said partitions.

5. An apparatus in accordance with claim 3 wherein said central openings in said plate means comprise progressively increasing diameters from said one end to said opposite end of said housings.

6. An apparatus in accordance with claim 3 wherein the means for passing said vapor to the exterior of said housings comprise a hollow tubular member mounted coaxially with respect to said housings, radially extending tubular scoop means communicating with said tubular member and terminating in inlet ends extending to points adjacent the inner surface of said inner housing, an enclosure defined in said opposite end for retaining said scoop means, a barrier separating the interior of said inner housing from said enclosure, said main duct means communicating with said enclosure whereby said vapor can be passed to said enclosure and removed therefrom by means of said scoop means.

7. An apparatus in accordance with claim 6 including means associated with said hollow tubular member for imparting rotary movement thereto.

8. An apparatus in accordance with claim 6 including vacuum means associated with said hollow tubular member of said outlet means for assisting in the withdrawal of said liquid component from said apparatus.

9. An apparatus for the separation of a liquid-solid solution comprising an outer housing, an inner housing disposed in spaced-apart relationship with respect to said outer housing, the spacing between said housings being of substantially uniform dimensions along the length of the housings, means rotatably supporting each of said housings and means for simultaneously rotating said housings, heating fluid inlet means at one end of said housings communicating with the space defined between said housings, outlet means for said heating fluid at the opposite end of said housings, inlet means for said solution situated at said opposite end and communicating with the interior of said inner housing, outlet means for said solution located at said one end, ventilating means located within said inner housing, and means communicating said inner housing with the exterior of said apparatus whereby vapor formed in said inner housing is adapted to be passed out of said inner housing with the aid of said ventilating means, a centrifugal evaporator, a conduit connecting said outlet means for said solution to said evaporator, a separator, means connecting said separator to said evaporator, and means for collecting the vapor component of said solution from said separator and for introducing said vapor component through said heating fluid inlet means.

10. An apparatus for the separation of a liquid-solid solution comprising an outer, horizontally disposed, cylindrical housing, an inner, horizontally disposed, cylindrical housing disposed in spaced-apart relationship with respect to said outer housing and mounted co-axially therewith, means rotatably supporting each of said housings and means for simultaneously rotating said housings about their axes, heating fluid inlet means at one end of said housings communicating with the space defined between said housings, means for introducing a heating fluid into said space which is heated to a temperature in excess of the boiling point of the liquid component of said solution, heating fluid outlet means at the opposite end of said housing whereby said fluid can be continuously circulated in one direction through said space, inlet means for said solution situated at said opposite end and communicating with the interior of said inner housing, outlet means for said solution at said one end whereby said solution can be continuously circulated through said inner housing in a direction opposed to said one direction, said means for rotating said housing being adapted to impose centrifugal force on said solution sufficient to maintain said solution as a confined, generally circular, band all around the interior of said inner housing, a ventilating means secured within said inner housing and rotatable therewith, and means communicating said inner housing with the exterior of said apparatus whereby vapor formed in said inner housing is adapted to be passed out of said inner housing with the aid of said ventilating means, said outlet means for said solution comprising a hollow tubular member mounted coaxially with respect to said housings, radially extending tubular scoop means communicating with said tubular member and terminating in inlet ends extending to points adjacent the inner surface of said inner housing, and an outer channel defined in said inner housing at said one end, the inlet ends of said scoops extending into said channel whereby solution spilling into said channel will be collected by said scoops.

11. An apparatus according to claim 10 including means associated with the hollow tubular member of said outlet means for imparting rotary movement thereto.

12. A method for effecting solid-liquid separation from a solution containing the same wherein there is provided a rotatable outer housing and an inner housing disposed within said outer housing, said inner housing being disposed in spaced-apart relationship with respect to said outer housing and being rotatable therewith, said method including the steps of introducing a heating fluid at one end of the housing into said space between said housings, passing said fluid through said space and withdrawing said fluid from the opposite end of the housings, said fluid having been heated to a temperature in excess of the boiling point of the liquid component of said solution, introducing said solution into said inner housing at said opposite end and withdrawing said solution from said one end whereby said solution is passed in counterflow relative to said fluid with the wall of said inner housing separating said solution and said fluid, and rotating said housings at a rate sufficient to impose centrifugal force on said solution, said force being sufficient to maintain said solution as a confined band all around the interior of said inner housing, removing the solution vapor formed through heat exchange between said fluid and said solution, removing the concentrated solution resulting after removal of said solution vapor, evaporating the concentrated solution, introducing the vapor obtained from the evaporation of said concentrated solution into a separator, separating solid components from said vapor in said separator, and thereafter introducing the vapor product obtained from said separator into said housings for use as said heating fluid.

13. A method for effecting solid-liquid separation from a solution containing the same wherein there is provided a rotatable outer housing, and an inner housing disposed within said outer housing, said inner housing being disposed in spaced-apart relationship relative to said outer housing and being rotatable therewith, said method includes the steps of continuously introducing at one end of said housings a heating fluid heated to a temperature in excess of the boiling point of the liquid component of said solution, said fluid being introduced into said space between said housings, continuously removing said fluid at the opposite end of said housings, continuously introducing said solution into said inner housing through said opposite end and withdrawing said solution at said one end whereby said solution moves in counterflow relative to said fluid, and rotating said housings at a rate sufficient to impose a centrifugal force on said solution sufficient to maintain said solution as a confined generally circular band all around the interior of said inner housing, providing ventilating means secured within the inner housing for driving the solution vapor formed through heat exchange between said fluid and said solution toward said opposite end of the housings, removing in gaseous form said solution vapor, removing the concentrated solution resulting after removal of said vapor, evaporating the concentrated solution, and thereafter introducing the vapor formed by said evaporation into said one end of said housings for use as said heating fluid.

References Cited by the Examiner

UNITED STATES PATENTS

| | | | |
|---|---|---|---|
| 1,420,648 | 6/1922 | Mabee | 159—6 |
| 1,483,194 | 2/1924 | Petersen | 159—6 |
| 2,623,580 | 12/1952 | Arnaud | 159—6 |
| 2,884,050 | 4/1959 | Brownell | 159—6 |
| 2,888,449 | 5/1959 | Borck | 159—6 |

FOREIGN PATENTS

| | | |
|---|---|---|
| 559,979 | 8/1957 | Belgium. |
| 91,318 | 4/1897 | Germany. |

NORMAN YUDKOFF, *Primary Examiner.*

J. SOFER, *Assistant Examiner.*